US007447241B2

(12) United States Patent
Fujii et al.

(10) Patent No.: US 7,447,241 B2
(45) Date of Patent: Nov. 4, 2008

(54) MULTIPLEXED AUDIO DATA DECODING APPARATUS AND RECEIVER APPARATUS

(75) Inventors: Yukio Fujii, Yokohama (JP); Shinichi Obata, Fujisawa (JP); Hiroaki Shirane, Yokohama (JP); Eiji Yamamoto, Tachikawa (JP)

(73) Assignees: Hitachi, Ltd., Tokyo (JP); Hitachi Video and Information Systems, Inc., Yokohama (JP)

( * ) Notice: Subject to any disclaimer, the term of this patent is extended or adjusted under 35 U.S.C. 154(b) by 616 days.

(21) Appl. No.: 10/945,905

(22) Filed: Sep. 22, 2004

(65) Prior Publication Data

US 2005/0039105 A1    Feb. 17, 2005

Related U.S. Application Data

(63) Continuation of application No. 09/433,049, filed on Nov. 3, 1999, now Pat. No. 6,816,491.

(51) Int. Cl.
*H04J 3/12* (2006.01)

(52) U.S. Cl. .................................. 370/536; 370/542

(58) Field of Classification Search ................. 370/536, 370/542
See application file for complete search history.

(56) References Cited

U.S. PATENT DOCUMENTS

| | | | |
|---|---|---|---|
| 4,817,146 A | | 3/1989 | Szczutkowski et al. |
| 5,420,866 A | * | 5/1995 | Wasilewski .................. 370/426 |
| 5,502,496 A | * | 3/1996 | Hailey et al. ................. 348/462 |
| 5,845,249 A | | 12/1998 | Malladi et al. |
| 5,914,955 A | | 6/1999 | Rostoker et al. |
| 6,026,088 A | | 2/2000 | Rostoker et al. |
| 6,167,521 A | * | 12/2000 | Smith et al. .................. 726/21 |
| 6,256,487 B1 | * | 7/2001 | Bruhn ........................ 455/352 |
| 6,288,748 B1 | | 9/2001 | Watanabe et al. |
| 6,378,101 B1 | | 4/2002 | Sinha et al. |
| 6,430,533 B1 | | 8/2002 | Kolluru et al. |
| 6,449,596 B1 | | 9/2002 | Ejima |

(Continued)

FOREIGN PATENT DOCUMENTS

JP         05-313908         11/1993

(Continued)

OTHER PUBLICATIONS

Design and Implementation of AC-3 Codes, vol. 41, No. 3, Aug. 1995.

*Primary Examiner*—Edan Orgad
*Assistant Examiner*—Jay P Patel
(74) *Attorney, Agent, or Firm*—Mattingly, Stanger, Malur & Brundidge, P.C.

(57) ABSTRACT

A multiplexed audio data decoder apparatus is provided in which integration of an audio decoder is easy, and has a high flexibility when the number of the formats to be processed is increased or when the specification is changed. In an external ROM 60 there are accumulated a plurality of decoding program codes corresponding to respective plural methods for compressing and encoding. A controller means 50 transfers the decoding program code corresponding to the method for compressing and encoding after changing thereof, from the external ROM 60 to an internal RAM 25. A DSP 22 starts decoding processing by using the decoding program code which is transmitted into the internal RAM 25.

25 Claims, 11 Drawing Sheets

U.S. PATENT DOCUMENTS

| | | | |
|---|---|---|---|
| 7,002,999 B2 * | 2/2006 | Watanabe et al. | 370/522 |
| 7,356,828 B2 * | 4/2008 | Townsend et al. | 725/39 |
| 7,375,761 B2 * | 5/2008 | Oku et al. | 348/441 |
| 7,389,287 B1 * | 6/2008 | Burke | 707/3 |
| 2001/0028780 A1 * | 10/2001 | Na et al. | 386/46 |

FOREIGN PATENT DOCUMENTS

| | | |
|---|---|---|
| JP | 06-295195 | 10/1994 |
| JP | 08-289255 | 11/1996 |

* cited by examiner

MULTIPLEXED AUDIO DATA DECODING APPARATUS AND RECEIVER APPARATUS

This is a continuation application of U.S. Ser. No. 09/433,049, filed Nov. 3, 1999 now U.S. Pat. No. 6,816,491.

BACKGROUND OF THE INVENTION

1. Field of the Invention

The present invention relates to a multiplexed audio data decoding apparatus for decoding voice/audio signals which are encoded with compression format, and in particular, to a multiplexed audio data decoding apparatus and a receiver apparatus which can be used preferably as a receiver for digitized broadcasting, in which many channels are multiplexed.

2. Description of Prior Art

As a method being applied to, in general, for compressing digital audio signals, there are known MPEG (Moving Picture Experts Group) Audio and a method so-called by "AC-3" which is applied to by ATSC (United States Advanced Television System Committee). Both of those methods are based upon a technology, in which information on a time axis is converted into data on a frequency axis, and is compressed by dividing it into frequency bands with using a psychological auditory characteristic, such as masking effects, or by using correlation between audio channels.

A method for decoding audio bit streams which are compressed by using those methods, being based on DSP (Digital Signal Processor), is described in "Design And Implementation of AC-3 Codes, Vol. 41 No. 3, August 1995", as an audio decoder corresponding to the AC-3 format. The DSP, in the same manner as a general micro-controller, takes a method of processing data by interpreting the software program codes in a built-in register(s) so as to store them into a memory(s). Therefore, as compared to the method for realizing or achieving it by means of hardware, it is possible for it to have decoding algorithms in plural formats as decoding process codes for each, and also it has a flexibility with the changes thereof, thereby being considered to be advantageous in both view points of costs and handling property thereof. Further, it is characterized by the fact that the calculation speed thereof is improved, by devising or providing a means of hardware for exclusive use, such as a high speed multiplier, or by smoothing the data flow therein with provision of a plurality number of data buses.

SUMMARY OF THE INVENTION

In an audio decoder based upon the DSP, in general, steps for the decoding processes are memorized in the built-in ROM as the program codes. This is due to the fact the ROM must be connected to the DSP, directly, because the program codes are exclusive only for use of readout thereof, and for the purpose of avoiding the losses thereof during access cycles (1 command/1 cycle in an ordinary DSP).

In a case of viewing the audio decoder as a part of a digital broadcast receiver, various conditions are required for compression rate and sound quality depending upon communication situations or conditions at a supply side, including contents of services, a broadcasting satellite, a communication satellite, ground wave, and wired cable, etc., for examples, and a format must be selected most appropriately for respective one of them. Therefore, there is a necessity for a receiver side to corresponds to those plural formats.

Here, for corresponding to the plural kinds of the compression code formats by means of one DSP chip, there is a necessity that the program codes for each of the formats are maintained in a form of the built-in ROM. And, not only for the program codes, but also for each of the formats, a table for the exclusive use for invariables or constants is necessary in the form of the built-in ROM. Accordingly, from a view point of scale in circuitry, there is a problem that it is difficult to integrate the audio decoder including the DSP. Also, in a case where the number of the formats to be processed increases or when trying to change the specification, since the built-in ROM cannot be easily changed therein, there is also a problem that the flexibility is decreased down.

An object of the present invention is to provide a multiplexed audio data decoder apparatus and a receiver apparatus, in which integration of the audio decoder is easy, therefore, having a high flexibility even in the case where the number of the formats to be processed increases or when trying to change the specification.

(1) For achieving the object mentioned above, according to the present invention, there is provided a multiplexed audio data decoder apparatus, for inputting a group of packets, each being formed by packetizing audio data sequences which are compressed and encoded and by multiplexing a plurality of those sequences, and for selectively decoding one audio data sequence which is designated by a user, comprising: a demultiplexer for extracting the one audio data sequence which is designated by the user from said group of packets depending upon a property or attribute information which each packet has, and further for extracting a method of the compression and encoding which is applied for compressing the audio data sequence from a header information which said each audio data sequence has; a first memory in which decoding process codes corresponding to said method of the compression and encoding; a digital signal processor for decoding the compressed audio data sequences in accordance with said decoding process codes, sequentially; a read-only memory, in which are accumulated a plurality of the decoding process codes, each corresponding to each one of said plural methods of the compression and encoding; and controller means for detecting change in said method of the compression and encoding, and for transferring the decoding process code corresponding to the method of the compression and encoding after being changed, from said read-only memory to said first memory, wherein said digital signal processor begins decoded process by using the decoding process code which is transferred to said first memory.

With such the construction, since the plural kinds of decoding process codes are stored in the read-only memory, it is possible to correspond or deal with the increase in the number of the formats to be processed and/or the change in the specification, by interchange of the read-only memory, with ease, as well as to improve flexibility thereof.

(2) For achieving the object mentioned above, according to the present invention, there is provided a multiplexed audio data decoder apparatus, for inputting a group of packets, each being formed by packetizing audio data sequences which are compressed and encoded and by multiplexing a plurality of those sequences, and for selectively decoding one set of a video data sequence and an audio data sequence accompanying therewith, which is designated by a user, comprising: a demultiplexer for extracting the one audio data sequence which is designated by the user from said group of packets depending upon a property or attribute information which each packet has, and further for extracting a method of the compression and encoding which is applied for compressing the audio data sequence from a header information which said each audio data sequence has; a first memory in which decoding process codes corresponding to said method of the compression and encoding; a digital signal processor for decoding the compressed audio data sequences in accordance with said decoding process codes, sequentially; a read-only memory, in which are accumulated a plurality of the decoding process codes, each corresponding to each one of said plural methods of the compression and encoding; a video decoder for decoding said video data sequence which is compressed and encoded; a second memory which said digital signal processor and said video decoder use as work area for the decoding process thereof; and controller means for transferring said plural decoding process codes from said read-only memory to said second memory in advance, as well as for detecting change in said method of the compression and encoding, and for transferring the decoding process code corresponding to the method of the compression and encoding after being changed, from said read-only memory to said first memory, wherein said digital signal processor begins decoding process by using the decoding process code which is transferred to said first memory.

With such the construction, since the plural kinds of decoding process codes are stored in the read-only memory, it is possible to correspond or deal with the increase in the number of the formats to be processed and/or the change in the specification, by interchange of the read-only memory, with ease, as well as to improve flexibility thereof.

(3) In the above-mentioned (1) or (2), preferably, after transmitting the decoding process code corresponding to the compressing and decoding method after the change thereof, from said read-only memory to said first or second memory, the digital signal processor conducts the process for deciding the presence of the transmission error.

(4) In the above-mentioned (3), preferably, in the decision process for deciding the presence of the transmission error, which is conducted by said digital signal processor, the audio data sequence specific to the decoding process code is decoded, so as to be compared with an expected value corresponding thereto.

DETAILED DESCRIPTION OF PREFERRED EMBODIMENT(S)

Hereinafter, the structure and the operation of a multiplexed audio data decoder apparatus according to an embodiment of the present invention will be fully explained by referring to the attached drawings, FIGS. 1 through 5.

First, a general construction of the multiplexed audio data decoder apparatus according to the present embodiment will be explained by referring to FIG. 1.

The multiplexed audio data decoder apparatus according to the present embodiment comprises a demultiplexer 10, an audio decoder 20, a digital/analog converter (DAC) 30, a user interface (I/F) 40, an external CPU 50, and an external ROM 60. The demultiplexer 10, the audio decoder 20, the user interface (I/F) 40, the external CPU 50 and the external ROM 60 are connected through a data bus DB to one another, thereby enabling to input and output commands and data to one another.

The demultiplexer 10 extracts data corresponding to a program which a user designates, from MPEG transport stream (TS) in which a plurality of programs are multiplexed, so as to output it to the audio decoder 20.

Here, the hierarchical structure of the MPEG transport stream (TS) is explained by referring to FIGS. 2(*a*) through (*e*). However, here, the explanation will be given on the audio data, for example.

Fig. 2 (*a*) shows the MPEG TS, which is inputted to the demultiplexer 10, and it is composed of a TS packet of a fixed length of 188 bytes, for example.

The TS packet, as shown in FIG. 2 (*b*), is constructed with a packet ID (PID) and a TS h as a header, and payload as the data portion. The PID can be determined uniquely by selecting the program number and the contents of data thereof. Accordingly, for example, by designating the audio data of the program #j to the demultiplexer 10 from the external CPU 50, it is possible for the demultiplexer 10 to extract only the TS packet to be processed.

The data (or payload) portion of the TS packet is a portion of PES (Packetized Elementary Stream) packet shown in FIG. 2(*c*). In other words, the payloads of a plurality of the TS packets come together, thereby constructing the PES packet.

The PES packet is, as shown in FIG. 2(*d*), constructed with a PES header and a payload as the data portion thereof. The PES header (PES_h) includes a stream ID, a Presentation Time Stamp (PTS), and a PES_h. The stream ID, being a description of contents of the PES, corresponds to an encoded format when it is for audio. The PES can have a plurality of audio access units in the payload, and the PES indicates a time when the first audio access unit after the header should be presented. The payload includes the data portion, i.e., the audio access unit.

Figure 2A:
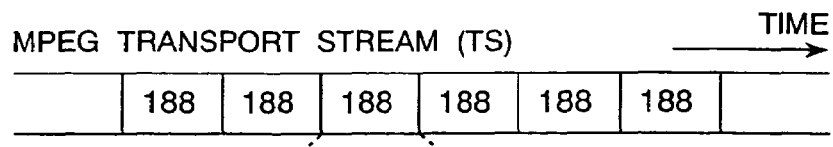
FIGS. 2(*a*) to (*e*) are views for explaining a hierarchical structure of MPEG transport stream (TS) which is inputted into the multiplexed audio data decoder apparatus, according to the embodiment of the present invention.
Figure 2B:
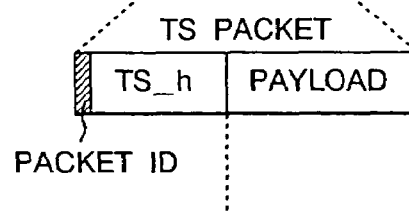
Figure 2C:
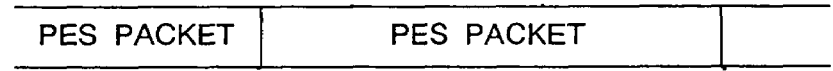
Figure 2D:
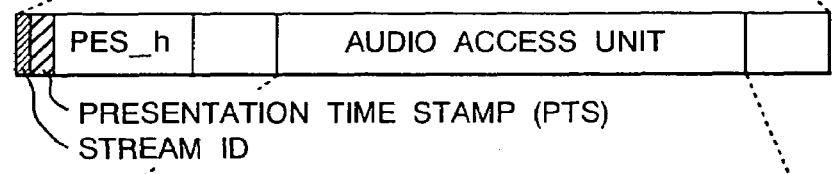
Figure 2E:
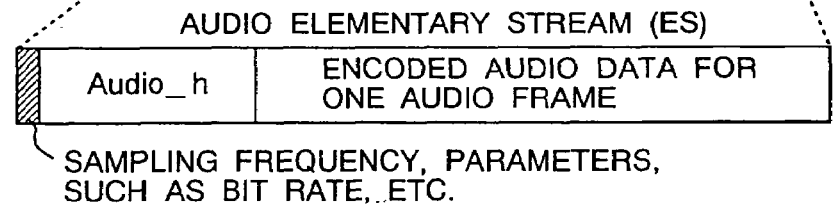

The audio access unit is, as shown in FIG. 2(e), constructed with an audio header (Audio_h) including various parameters, and an encoded audio data for one audio frame as the data portion. As those parameters of the header, there are included a sampling frequency, a bit rate, a frame length, etc. Continuity of the audio access units constructs an audio elementary stream (ES). The output of the demultiplexer 10 is the audio elementary stream (ES) that is the continuity of the audio access units shown in the FIG. 2(e).

Next, turning back to the FIG. 1, explanation will be given on the structure of the audio decoder 20.

The audio decoder 20 comprises a frame synchronizing circuit 21, a digital signal processor (DSP) 22, a PCM output interface (I/F) circuit 23, an interface (I/F) circuit 24, and a built-in RAM 25.

The frame synchronizing circuit 21 decides or detects the end of the audio access unit as the unit of process from the audio elementary stream (ES) inputted from the demautiplexer 10, i.e., the end of data of the audio frame made of a predetermined number of the encoded samples from the bit patterns appearing periodically.

The DSP 22 extracts the necessary data, appropriately, from a header information of the audio access unit, so as to decode the encoded data. The decoding process is accorded with a decoding process program code which is written in the built-in RAM 25 in advance, and is conducted by using the built-in RAM 25 for storing the intermediate data, or using it as a buffer for the input and output data thereof.

In the built-in RAM 25 is written plural kinds of decoding process program codes in advance, however the write-in of the decoding process program codes is conducted by the exterior CPU 50 through the interface (I/F) 24.

The result of decoding by the DSP 22 is PCM (Pulse Code Modulation) audio data, and is transmitted from the PCM output interface (I/F) circuit 23 to the digital/analog converter (DAC) 30 as a time sequential sample data, thereby to be outputted as an analog audio signal.

The external CPU 50 is provided for system controlling of the multiplexed audio data decoder apparatus, including the audio decoder 20 and the demultiplexer 10, and the control steps thereof are stored in a CPU command code area 60A within the external ROM 60.

The external ROM 60, other than the CPU command code area 60A, comprises a decoding process code areas 60B1, 60B2, . . . 60BN in which a plurality of decoding process codes #1, #2, . . . #N are stored.

The user interface (I/F) circuit 40 receives commands, such as that for changing program, that for changing the medium, etc., and transfers the commands to the external CPU 50. The external CPU 50, when detecting the change or switch-over in the encoding format, transfers appropriate decoding process codes #1, #2, . . . #N which are stored in the code areas 60B1, 60B2, . . . 60BN within the external ROM 60 to an internal RAM 52 within the audio decoder 20. The transfer process is conducted through the interface (I/F) 24, and also are performed by buffering and address conversion.

Figure 3:
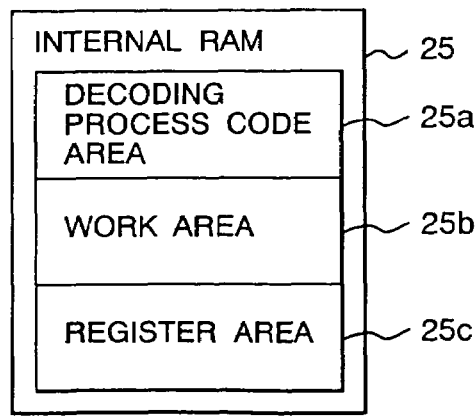
FIG. 3 is view for showing an example of memory arrangement of an built-in ROM which is used in the multiplexed audio data decoder apparatus, according to the embodiment of the present invention.

Here, by referring to FIG. 3, explanation will be given on the memory arrangement of the internal RAM circuit 25 which is applied into the multiplexed audio data decoder apparatus according to the present embodiment. The FIG. 3 shows division of the area within the internal RAM 25, in diagrammatic manner.

The internal RAM circuit 25 is constructed with a decoding process code area 25a, a work area 25b, and a register area 25c. Among the decoding process codes #1, #2, . . . #N which are stored in the code areas 60B1, 60B2, . . . 60BN within the external ROM 60 shown in the FIG. 1, the decoding process code(s) being transferred by the external CPU 50 is stored into the decoding process code area 25a. The work area 25b and the register area 25c are the areas which are used by the DSP 22 when conducting the decoding process. Boundary on each of the areas 25a, 25b and 25c is variable by means of the encoding format, therefore, for example, the work area 25b can be set to be broad or wide when the format is short in length of the process code.

The DSP 22 conducts an error check on the data which is transferred, and also conducts the decoding process on the arriving audio ES by use of the decoding process code which is stored in the decoding process code area 25a within the internal RAM 25.

Next, explanation will be given on a program switching or changing process in the multiplexed audio data decoder apparatus according to the present embodiment, by referring to FIGS. 4 and 5.

Figure 4:
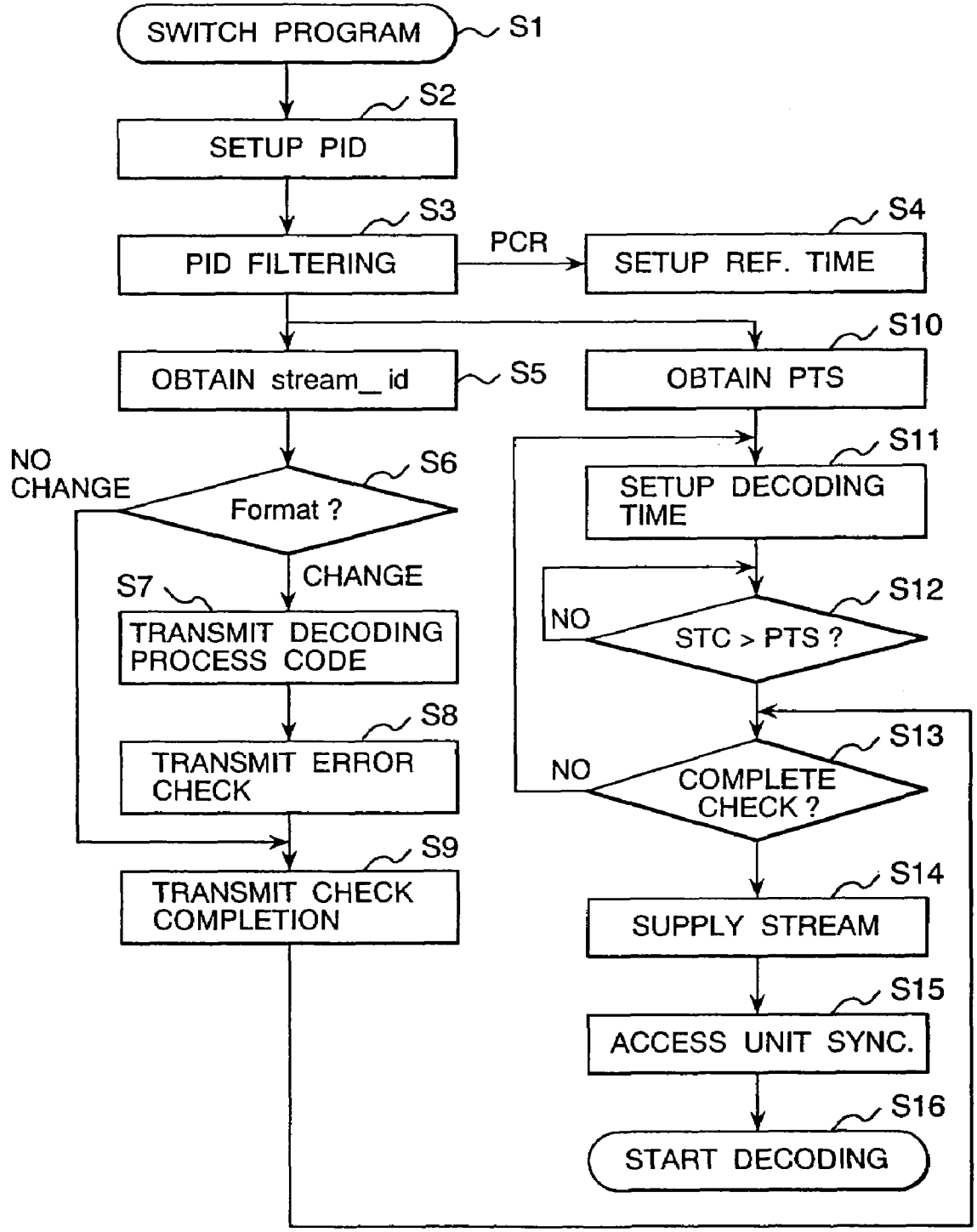
FIG. 4 is a flow chart for explaining switching process of programs in the multiplexed audio data decoder apparatus, according to the embodiment of the present invention.
Figure 5:
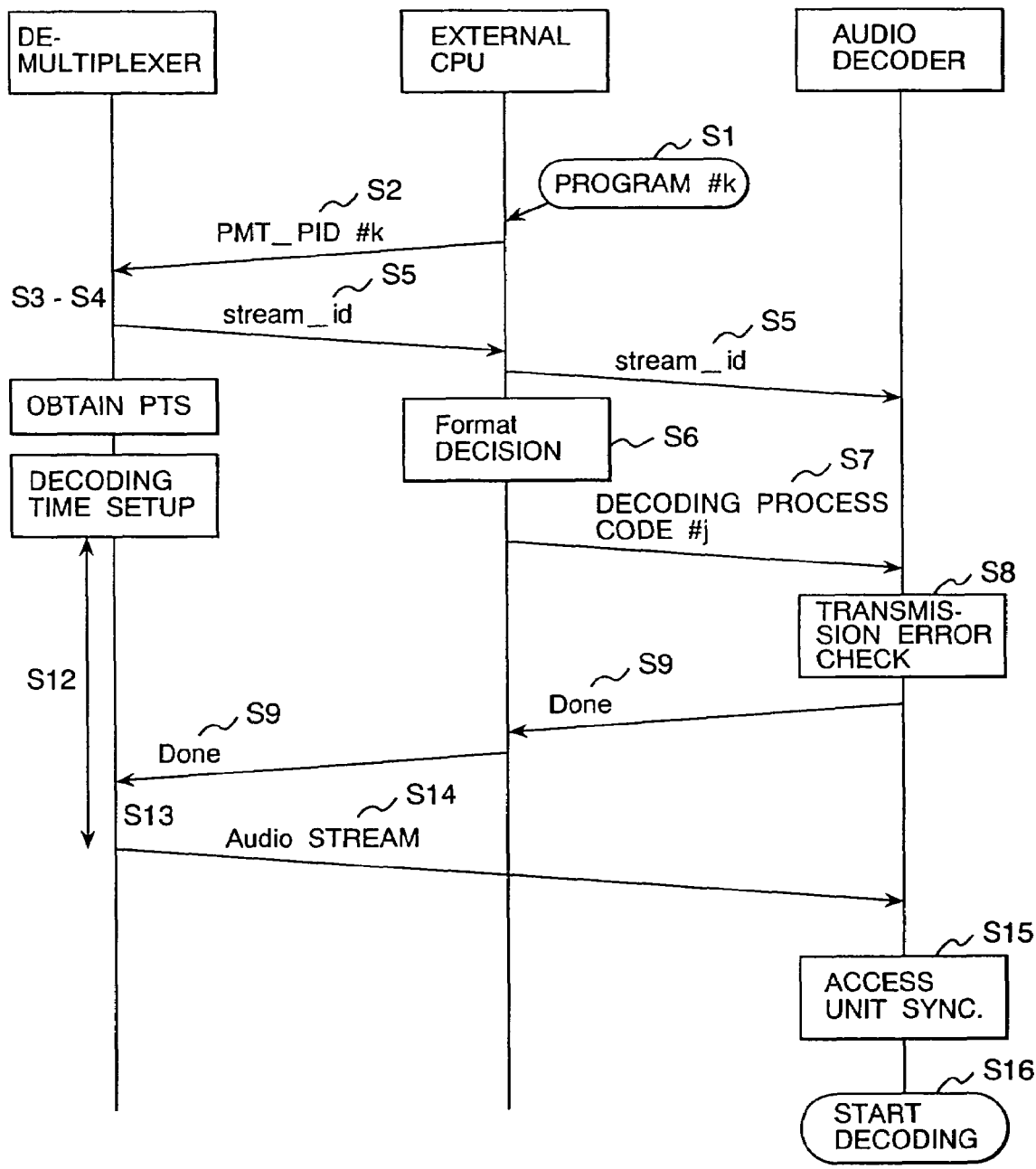
FIG. 5 is a view for explaining signal transmissions in the switching process of programs in the multiplexed audio data decoder apparatus, according to the embodiment of the present invention.

The FIG. 4 shows the program switching or changing process focusing mainly on the algorithm thereof, and the FIG. 5 shows it focusing mainly on the transfers of signals between the constructive blocks thereof. Further, in the FIGS. 4 and 5, the same reference numerals indicate the steps in the process, being same to each other.

In a step S1, the program switching or changing process is started. For example, when the user conducts switching or changing of the program by using a remote controller or the like, a program switch command is transferred to the external CPU 50 through the user I/F 40 shown in the FIG. 1, and the program switching process is started by the external CPU 50. However, in the explanation below, it is assumed that the user selects the program #k.

Next, in a step S2, the external CPU 50 transfers the packet ID (PID) of a program map table (PMT) corresponding to the program number #k to the demultiplexer 10. The PMT is stored in the multiplexer 10.

Next, in a step S3, the demultiplexer 10 conducts the filtering on the desired PID of the packet (i.e., in the present example, the audio packet). Here, in the obtained PMT are written the PID of the transport stream (TS) packet, including the video, audio data and supplemental data thereof, which belongs to the program number #k, together with the property of attribute thereof, therefore the demultiplexer 10 conducts the filtering on this PID.

Next, in a step S4, the demultiplexer 10 picks up a reference time from the packet carrying a PCR (Program Clock Reference) of indicating a reference on a time axis, which is contained within the supplemental data, so as to set up this reference time.

Next, in a step S5, the demultiplexer 10 obtains the stream ID from the header portion in the PES (Packetized Elementary Stream) packet of the audio data, so as to transfer it to the external CPU 50 and the audio decoder 20.

Next, in a step S6, the external CPU 50 notices or detects the audio encoding format after the program has been switched or changed over, and it decides the presence of the switching or changing from the present format. If no switching can be notices, the process jumps to a step S9, while it proceeds to a step S7 if there is detected the switching.

And, if there is detected the changing in the step S7, the external CPU 50 reads out the decoding process code corresponding to the audio coding format after the program has been switched over, from the decoding process code areas 60B1, 60B2 . . . 60BN in the external ROM 60, so as to transfer it to the audio decoder 20. The transferred decoding process code is stored in the decoding process code area 25a within the internal RAM 25.

Next, in a step 8, the DSP 22 of the audio decoder 20 conducts an error check for confirming the transfer errors in the decoding process code which is transferred. As a methodology for the error check, there can be applied a method, in which a CRC (Cyclic Redundancy Check) code or a test data is decoded actually, so as to be compared with an expected value thereof, etc. If there is the error(s), the audio decoder 20 gives a request for re-transfer to the external CPU 50, and conducts the check again on the decoding process code which is re-transferred.

When the error check is completed in the step S9, the DSP 22 sends a check complete signal back to the external CPU 50, and the external CPU 50 transfers this to the demultiplexer 10.

While, the demultiplexer 10, in the step S5 following to the steps S3 and S4, obtains the presentation time stamp (PTS) from the PES header.

Next, in a step S11, the demultiplexer 10 sets up a decoding time on a basis of the time at the head of the audio access unit which the PTS indicates.

Next, in a step S12, the demultiplexer 10 supervises when it comes up to be the decoding time (the PTS time) which is set up by using the internal system time code (STC), and it stops the stream by accumulating the inputted stream into the internal buffer.

Further, at the time point when it comes up to be the PTS time, the demultiplexer 10 confirms the completion in checking the transfer error on the code which is transferred in the process of the step S9 by the audio decoder 20.

If the check is not completed yet, the process turns back to the step S11 in relation to a next set of the PTS and the audio access unit, and it waits for the PTS time.

On the contrary, if the check is completed, the demultiplexer 10 supplies the audio elementary stream (ES) to the audio decoder 20 in a step S14.

Next, in a step S15, the frame synchronizing circuit 21 of the audio decoder 20 conducts a frame (i.e., by an access unit) synchronization process on the audio ES inputted.

Next, in a step S16, the DSP 22 starts the decoding process by using the decoding process code which is stored in the internal RAM circuit 25.

As is explained in the above, according to the present embodiment, it is so constructed that the decoding process codes for the plural kinds of the encoded formats are stored in the external ROM connected to an outside of the audio decoder. And, one kind of the decoding process code is read out corresponding to the encoding format of the audio stream inputted, thereby to be stored in the code area in the internal RAM of the audio decoder. The DSP conducts the decoding process by using the decoding process code stored in the internal RAM. Here, a capacity can be taken in the external ROM to be large enough, therefore there is not brought about an increase in the cost when increasing the corresponding formats in the number thereof.

Further, for the addition of the formats to be processed and the change in the specification of the apparatus, it is possible to deal with it/them with ease by exchanging the external ROM, but without exchanging the audio decoder including the DSP.

However, as a method for exchanging the external ROM, it can be performed by interchanging it with an external ROM, in which new decoding process codes are written. Also, as an another method for it, in particular when a re-writable flash ROM is used as the external ROM, the changing can be performed by writing the new decoding process code into the flash ROM. However, in this instance, the new decoding process code may be read out from the memory medium, such as the disc, or it may be downloaded from a network.

Figure 10:
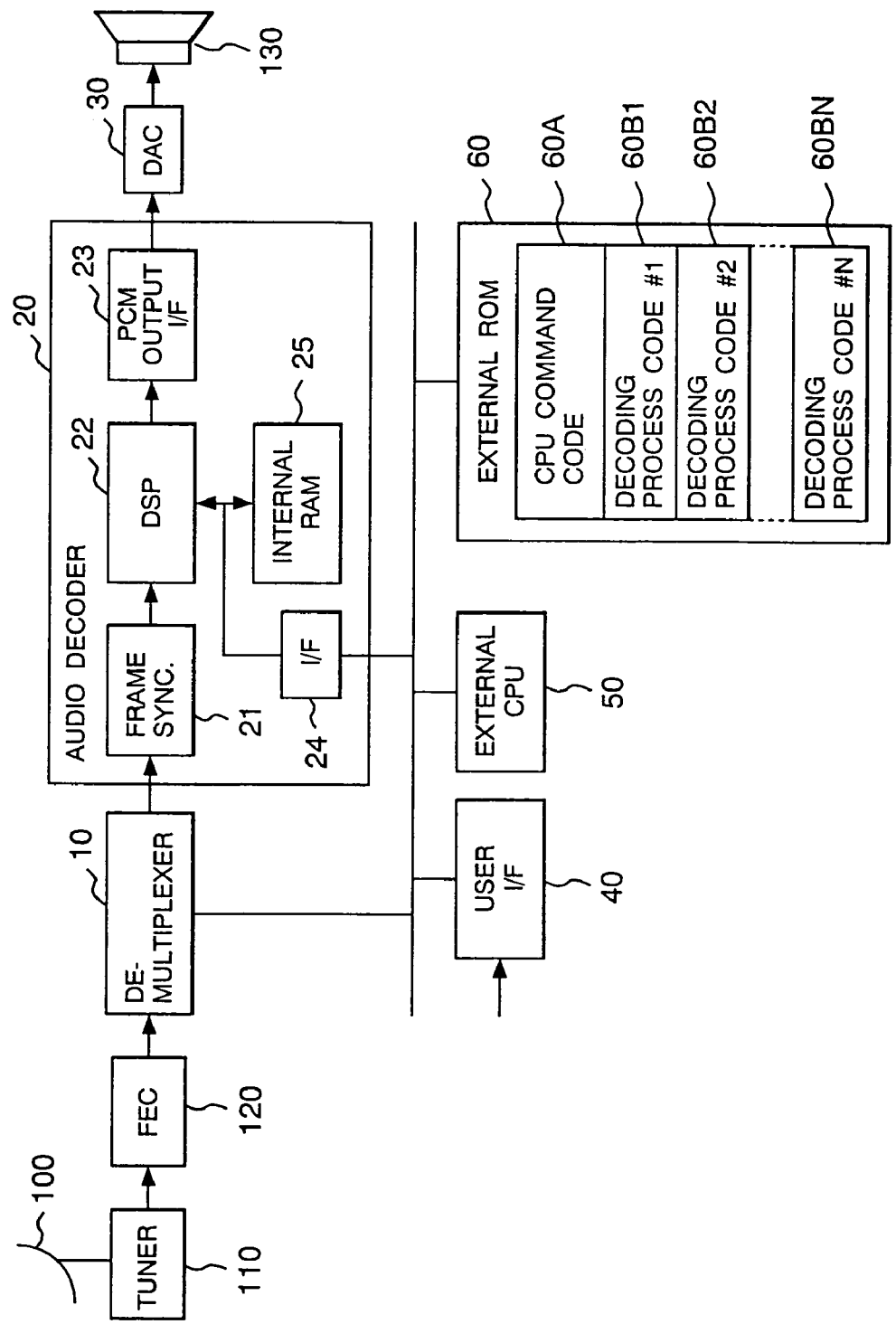
FIG. 10 is a block diagram for showing a receiver apparatus for receiving broadcast in which the multiplexed audio data decoder apparatus according to the present invention is installed.

Here, an example is shown in FIG. 10, into which the multiplexed audio decoder apparatus according to the present embodiment explained above is applied.

The FIG. 10 shows a receiver apparatus for receiving broadcasts, wherein a reference numeral 100 indicates an external antenna for receiving the broadcasting signals, 110 a tuner for selecting channel or tuning the broadcasting signals which are received, 120 an error correction (FEC) circuit for conducting the process, such as error correction, as well as for outputting it to the demultiplexer 10, and 130 a speaker for outputting an analog audio signal of the DAC 30.

As is explained in the above, the present invention can be applied to the receiver apparatus for the broadcast, in which the coding format is exchanged or switched.

Next, explanation will be given on the structure and operation of the multiplexed audio data decoder apparatus according to the another embodiment of the present invention, by referring to the FIGS. 6 through 9.

First of all, by referring to the FIG. 6, explanation will be given on an entire structure of the multiplexed audio data decoder apparatus according to the present embodiment. However, the same reference numerals in the FIG. 1 indicate the same portions or elements thereof.

Figure 1:
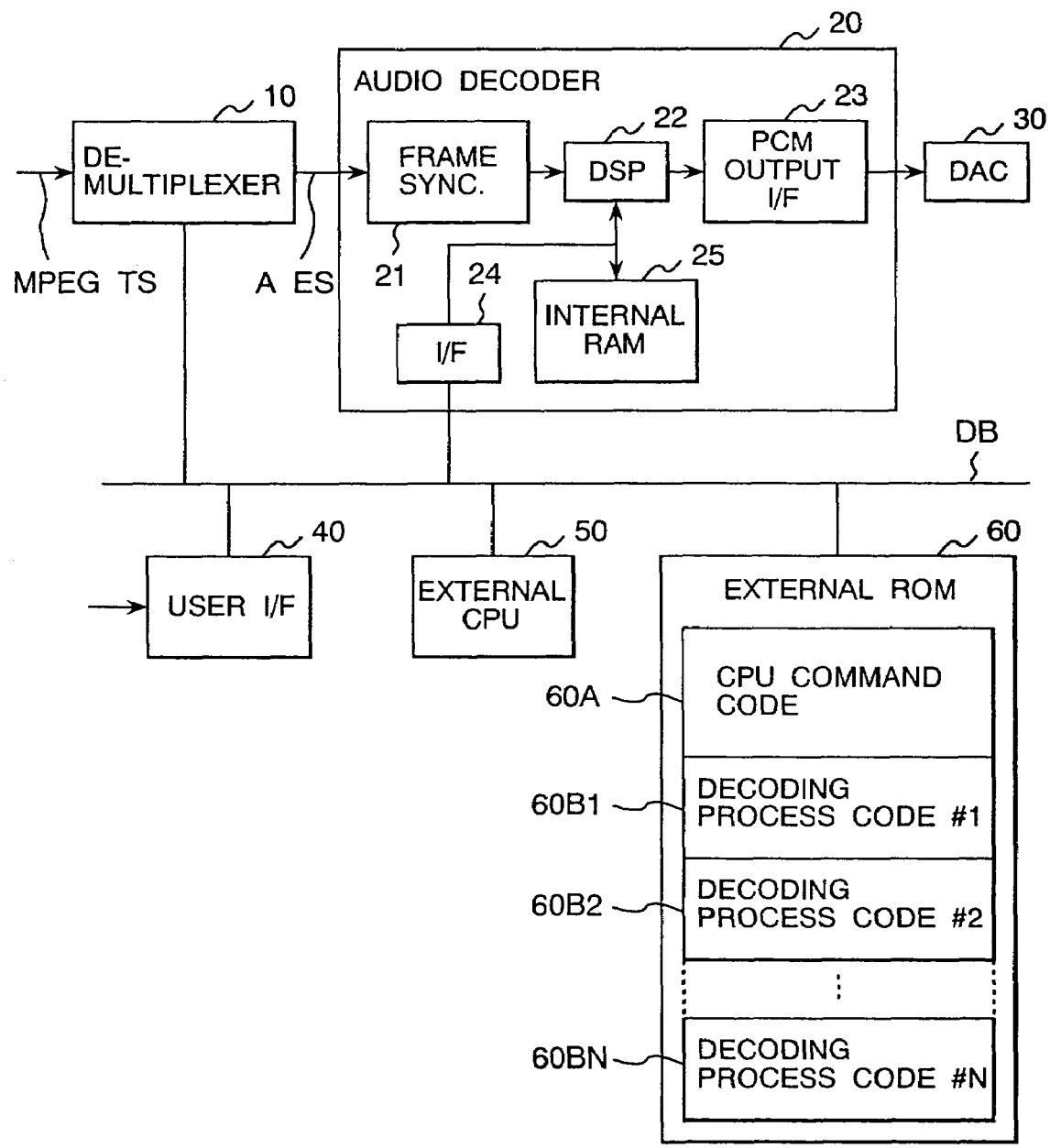
FIG. 1 is a block diagram of showing an outlook construction of an multiplexed audio data decoder apparatus, according to an embodiment of the present invention.

The multiplexed audio data decoder apparatus according to the present embodiment further comprises a video decoder 70, an A/V decode memory 80 and a digital/analog converter 35, in addition to the structure of the multiplexed audio data decoder apparatus shown in the FIG. 1.

An output of the demultiplexer 10 is inputted to the video decoder 70, as well as to the audio decoder 20. The audio decoder 20 and the video decoder 70 are so constructed that they can access the common A/V decode memory 80 in time sharing or dividing. The A/V decode memory 80, since it is realized as an external memory chip of large capacity (of a unit of megabytes), has a capacity being enough to be assigned for the audio decoding other than the capacity necessary for the video decoding.

Here, explanation will be given on the allocation inside the A/V decode memory 80, which is used in the multiplexed audio data decoder apparatus according to the present embodiment.

In the A/V decode memory 80, there are provided a stream buffer area 80a and a work area 80b, such as the frame buffer, etc., and further a buffer 80c for use of graphic display, so as to achieve an interface as the broadcast receiver.

Also, in the A/V decode memory 80, there is provided a work area 80d for the audio decoding, to which the audio decoder 20 can access. In the work area 80d for the audio decoding, there are assigned the decoding process code areas 80d1, . . . 80dN for storing the decoding process program codes for all of the corresponding coding formats therein.

Figure 6:
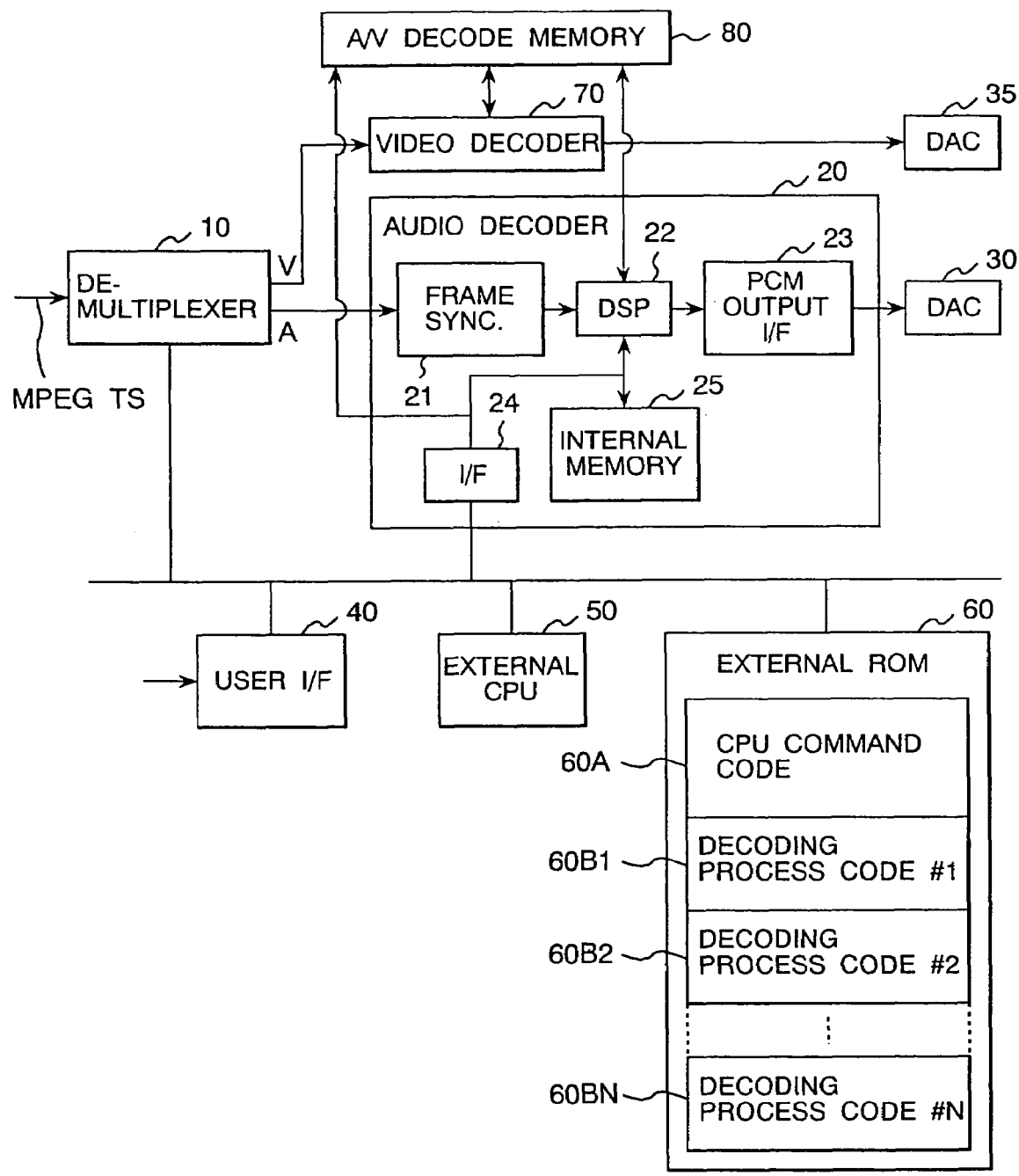
FIG. 6 is a block diagram of showing an outlook construction of an multiplexed audio data decoder apparatus, according to another embodiment of the present invention.
Figure 7:
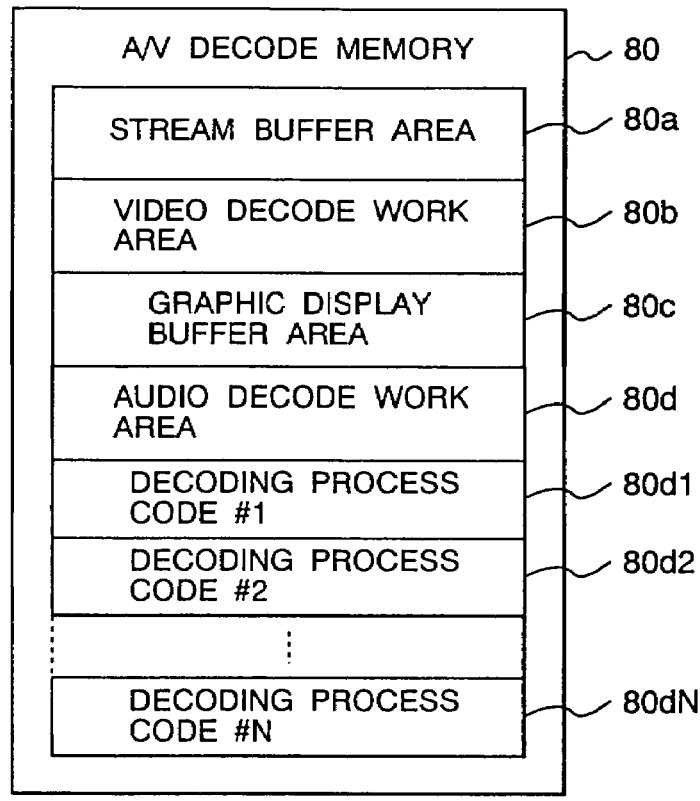
FIG. 7 is a view for explaining allocation inside an A/V decode memory 80 which is used in the multiplexed audio data decoder apparatus, according to the embodiment of the present invention.

In the decoding process code areas 80d1, . . . 80dN, the decoding process codes #1, . . . #N, which are stored in the decoding process code areas 60B1, . . . 60BN of the external ROM 60 shown in the FIG. 6, are stored after being transferred once.

Figure 8:
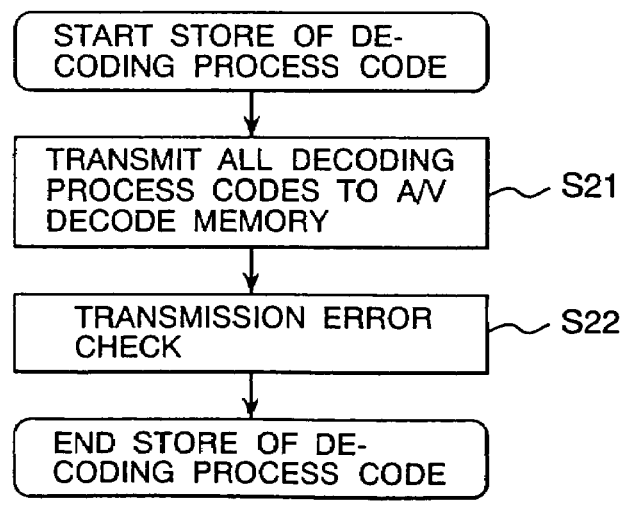
FIG. 8 shows a flow chart for store process of the decoding process code in the multiplexed audio data decoder apparatus, according to the embodiment of the present invention.

Here, explanation will be given on the storing process for the decoding process code according to the present embodiment, by referring to the flow chart shown in the FIG. 8.

In a step S21, the external CPU 50 transfers the decoding process codes #1, ... #N stored in the decoding process code areas 60B1, ... 60BN in the external ROM 60 to the A/V decode memory 80 through the interface (I/F) circuit of the audio decoder 20.

Next, in a step S22, the DSP 22 of the audio decoder 20 checks up the transfer error(s) in the decoding process code(s) stored into the A/V decode memory 80. The check of the transfer error(s) is performed by a CRC check in which N formats are checked collectively together.

Next, explanation will be given on the program switching process in the multiplexed audio data decoder apparatus according to the present embodiment, by referring to the FIG. 9.

Figure 9:
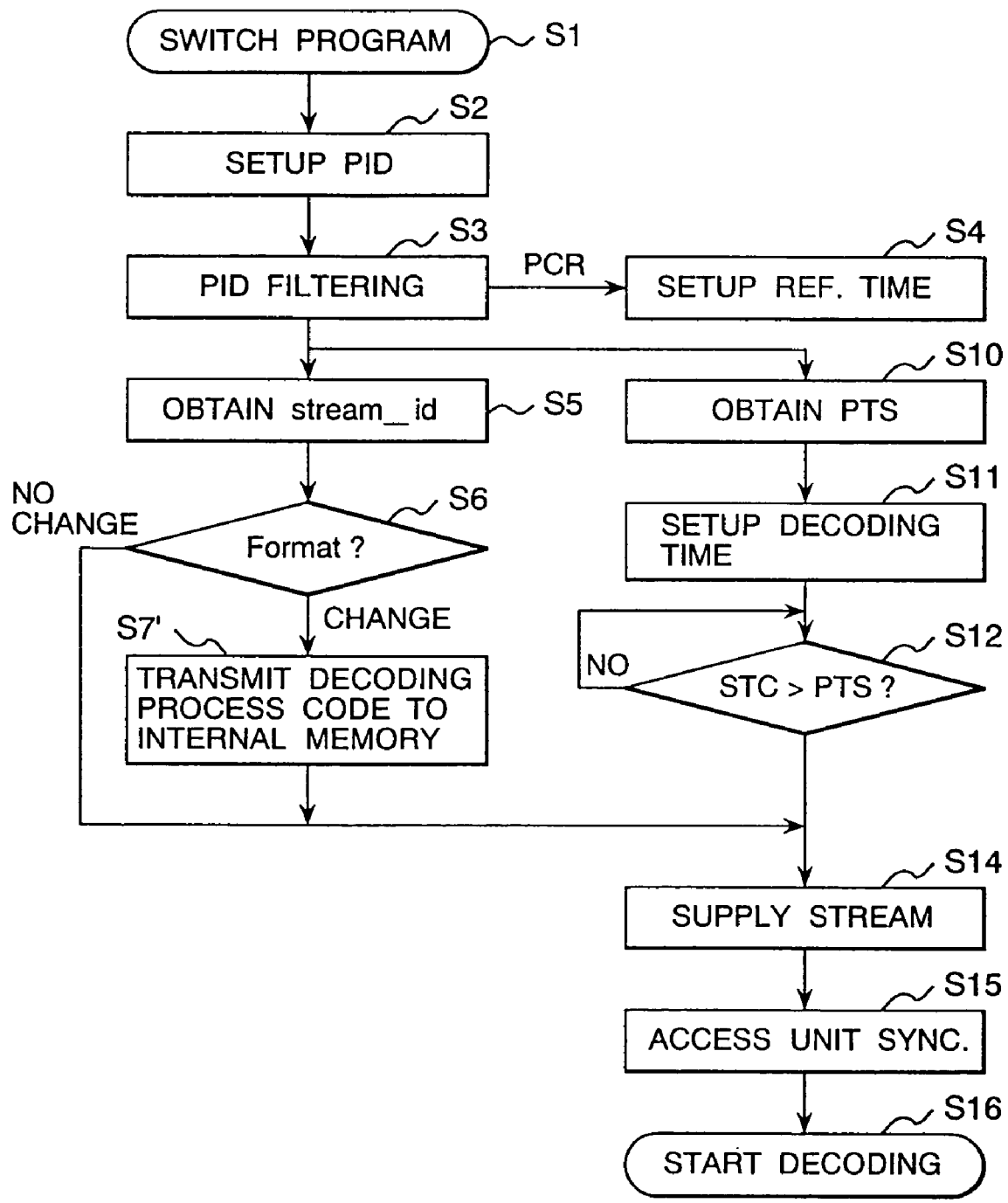
FIG. 9 is a flow chart for explaining program switch process in the multiplexed audio data decoder apparatus, according to the embodiment of the present invention.

The FIG. 9 shows the program switching process according to the present embodiment, mainly focusing on the algorithm thereof. However, the same reference numerals indicate the same process steps shown in the FIGS. 4 and 5.

In the program switching process according to the present embodiment, the step S7 is replaced by a step S7' in the program switching process shown in the flow chart of the FIG. 4, and the steps S8, S9 and S13 are deleted there that shown in the FIG. 4, therefore explanation will be given on those differences.

In the decision in the step S6, when the external CPU 50 decides that the audio coding format after switch-over of the program is changed from the present format, the DSP 22 transfers the decoding process code after the switch-over from the decoding process code areas 80d1, ... 80dN in the A/V decode memory 80 to the internal memory 25.

In general, since the A/V decode memory 80 has a transmission band width being enable to put up with the video decoding process, the time necessary for transmitting one kind of the decoding process code can be made short in sufficient, comparing to that when it is transmitted from the external ROM 11.

Also, a reliability in the transmission of the data is confirmed in the access when it is decoded, therefore it is not necessary to make the transmission error check again.

As is explained in the above, in the present embodiment, the decoding process codes corresponding to the plural kinds of the encoding formats from the external ROM are stored into the A/V decode memory which is connected to outside of the audio decoder. And, corresponding to the encoding format of an audio stream to be inputted, one kind of the decoding process code corresponding to the encoding format which is stored into the A/V decode memory is read out, thereby to be stored in the code area in the internal RAM of the audio decoder.

The DSP is so constructed that it conducts the decoding process by using the decoding process codes which are stored in the internal RAM. Here, since the A/V decode memory can be made large enough, therefore there is no chance to bring about the increase in the cost, even when the number of the corresponding formats is increased up.

Also, for the addition of the formats to be processed and the change in the specification of the apparatus, there is no necessity of changing the audio decoder including the DSP, therefore it is possible to deal with it/them with ease, only by interchanging the external ROM.

Further, it is also possible to shorten the time necessary for transmitting the one kind of the decoding process code.

Also, the reliability in the transmission of the data is confirmed in the access conducted when it is decoded, therefore it is not necessary to make the transmission error check again.

Figure 11:
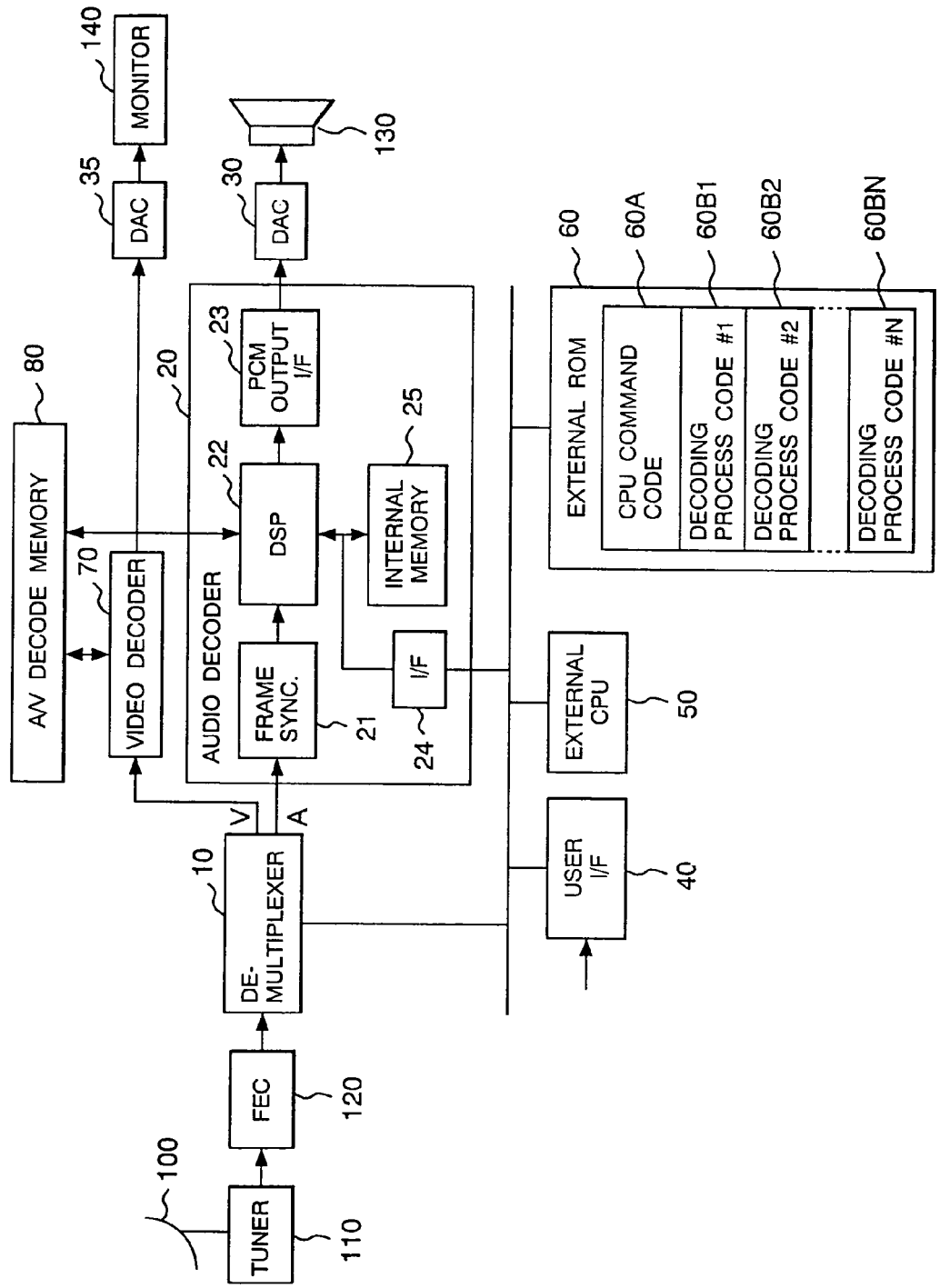
FIG. 11 is also a block diagram for showing an another receiver apparatus for receiving broadcast, in which the multiplexed audio data decoder apparatus according to the present invention is installed.
Figure 12:
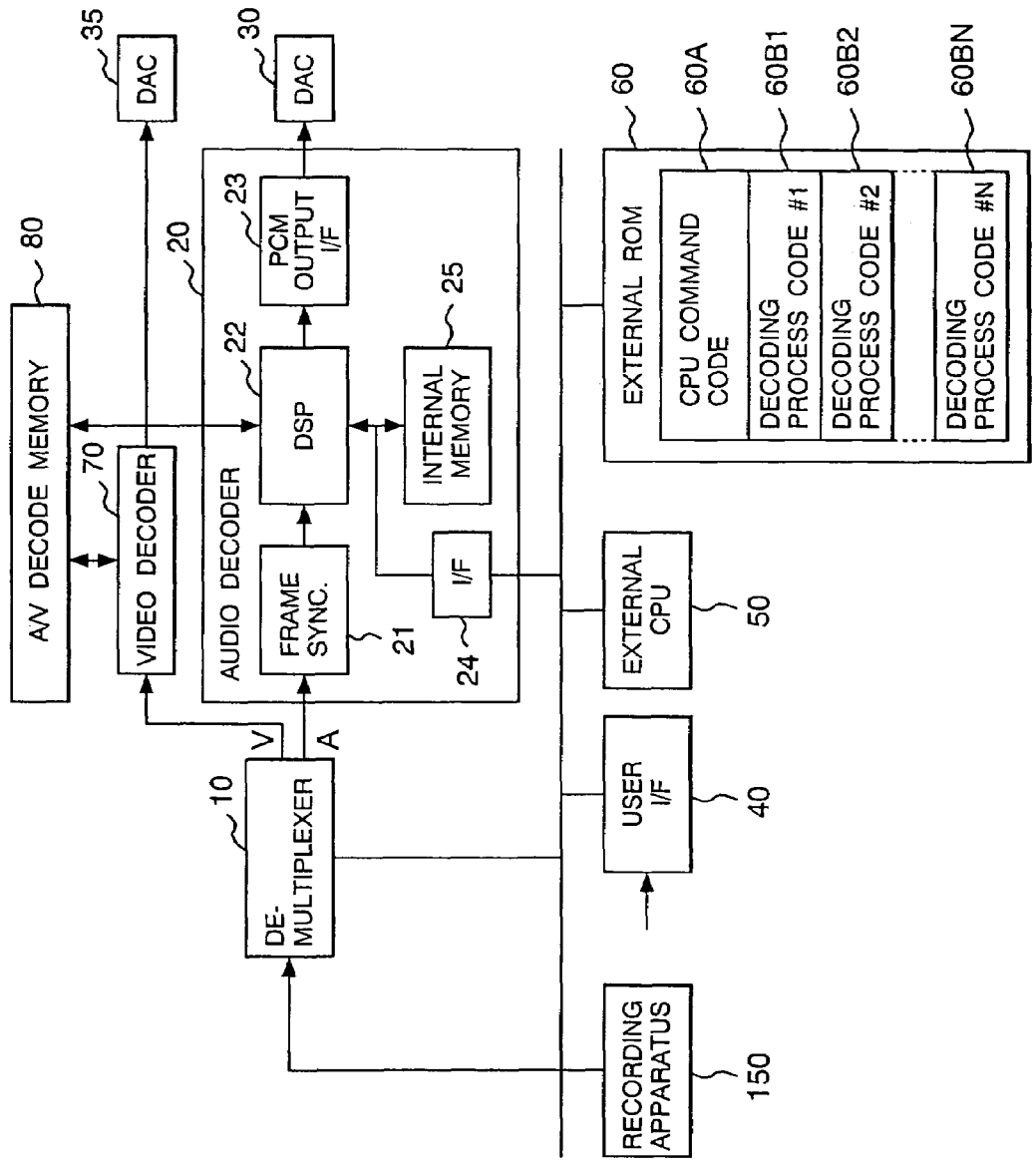
FIG. 12 is also a block diagram for showing a recording/reproducing apparatus built-in receiver apparatus for receiving and recording/reproducing broadcast, in which the multiplexed audio data decoder apparatus according to the present invention is installed.
Figure 13:
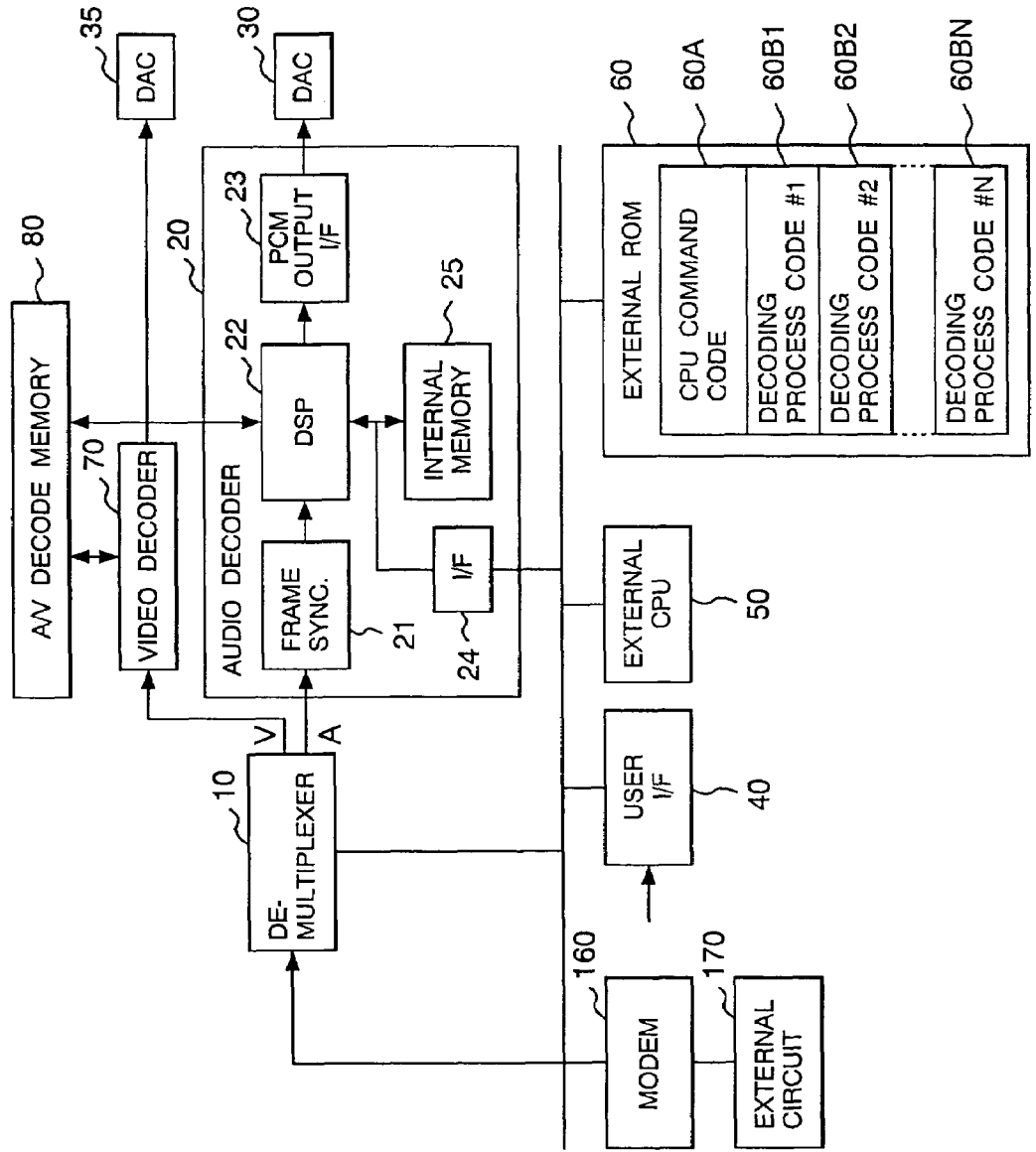
FIG. 13 is a block diagram for showing a communication apparatus in which the multiplexed audio data decoder apparatus according to the present invention is installed.

Here, examples are shown in FIGS. 11 through 13, into each of which the multiplexed audio decoder apparatus according to the present embodiment explained above is applied.

The FIG. 11 shows a receiver apparatus for receiving broadcasts, wherein a reference numeral 100 indicates an external antenna for receiving the broadcasting signals, 110 a tuner for selecting channel or tuning the broadcasting signals which are received, 120 an error correction (FEC) circuit for conducting the process, such as error correction, as well as for outputting it to the demultiplexer 10, 130 a speaker for outputting an analog audio signal of the DAC 30, and 140 a monitor for outputting the analog video signal of the DAC 35.

As is explained in the above, the present invention can be applied to the receiver apparatus for receiving the broadcast, the coding format of which is switched or changed.

Also, the FIG. 12 shows a recording/reproducing apparatus built-in receiver apparatus in which the multiplexed audio decoder apparatus is assembled or installed, for receiving broadcast signals and for recording/reproducing thereof, wherein a reference numeral 150 indicates a recording apparatus for recording/reproducing the broadcast signals, which outputs the reproduced signal to the demultiplexer 10. However, the external antenna 100, the tuner and the error correction circuit 120, which are shown in the FIG. 11, are omitted here.

As is mentioned in the above, it is possible to apply the present invention to the recording/reproducing apparatus built-in receiver apparatus for receiving and recording/reproducing the broadcast signals, the encoding format of which is switched or changed.

Also, the FIG. 13 shows a communication apparatus in which the multiplexed audio decoder apparatus is assembled or installed, wherein a reference numeral 170 indicates an external circuits, such as the Internet, 160 a modem for receiving from the external circuits, and an external information from the modem is outputted to the demultiplexer 10.

As is mentioned in the above, it is possible to apply the present invention as the communication apparatus for receiving the communications, in which the encoding format thereof is switched or changed.

According to the present invention, it is easy to integrate the audio decoder and to improve the flexibility, even when trying to increase the number of the formats to be processed and/or to change the specification of the appratus.

While we have shown and described several embodiments in accordance with out invention, it should be understood that disclosed embodiments are susceptible of changes and modifications without departing from the scope of the invention. Therefore, we do not intend to be bound by the details shown and described herein but intent to cover all such changes and modifications falling within the ambit of the appended claims.

What is claimed is:

1. A digital broadcast receiver for receiving a broadcast signal having a group of packets, each being formed by packetizing audio data sequences which are encoded and by multiplexing a plurality of those sequences, and for selectively decoding one audio data sequence, comprising:
a tuner which receives the broadcast signal;
a demultiplexer coupled to the tuner for extracting said one audio data sequence which is designated by a user from said group of packets depending upon a property or attribute information which each packet has, and further for extracting a method of encoding which is applied for encoding said one audio data sequence from said one audio data sequence; and a decoder section having an audio decoder for decoding said one audio data sequences in accordance with a set of decoding program codes if no change in encoding of said one audio data sequence is detected, wherein, when a change in encoding of said one audio data sequence is detected, the decoder section decodes said one audio data sequence in accordance with another set of decoding program codes after it is confirmed that the another set of decoding program codes is received by the decoder section without transfer error.

2. The digital broadcast receiver according to claim 1, wherein said broadcast signal corresponds to a particular program having a program number which has a corresponding program map table (PMT), and wherein, when a change in the PMT is detected, the decoder section decodes the audio data sequence in accordance with another set of decoding program codes.

3. The digital broadcast receiver according to claim 1, wherein said broadcast signal further comprises video data sequences which are packetized, encoded, and wherein said decoding section further comprises a video decoder for decoding said video data sequences and the digital broadcast receiver further comprising an A/V decoder coupled to both the audio decoder and the video decoder so as to enable common access by each decoder.

4. The digital broadcast receiver according to claim 1, wherein the decoder section further comprises:

a memory in which a plurality of decoding program codes are accumulated corresponding to plural methods of compression and encoding; and a digital signal processor for decoding the compressed audio data sequences in accordance with said decoding program codes.

5. The digital broadcast receiver according to claim 1, wherein in order to confirm that the another set of decoding program codes is received by the decoder section without transfer error, the demultiplexer obtains a presentation time stamp (PTS) from said one audio data sequence and determines when decoding time is reached by using an internal system time code (STC); and wherein, when the decoding time is reached, the demultiplexer confirms whether the another set of decoding program codes is received by the decoder section without transfer error before supplying said one audio data sequence to the decoder section.

6. The digital broadcast receiver according to claim 1, wherein, in order to detect the change in encoding of said one audio data sequence, the demultiplexer obtains a stream ID from a header portion of a packetized elementary stream (PES) packet of said one audio data sequence.

7. A recording/reproducing apparatus for receiving a broadcast signal having a group of packets, each being formed by packetizing audio data sequences which are encoded and by multiplexing a plurality of those sequences, and for selectively decoding one audio data sequence, comprising:

a recorder for recording the broadcast signal; and a decoder section coupled to the recorder and decoding said one audio data sequence according to a set of decoding program codes if no change in encoding of said one audio data sequence is detected, wherein, when a change in encoding of said one audio data sequence is detected, the decoder section decodes said one audio data sequence in accordance with another set of decoding program codes after it is confirmed that the another set of decoding program codes is received by the decoder section without transfer error.

8. The recording/reproducing apparatus according to claim 7, wherein the decoder section further comprises:

a memory in which a plurality of decoding program codes are accumulated corresponding to plural methods of encoding; and a digital signal processor for decoding the audio data sequences in accordance with said decoding program codes.

9. The recording/reproducing apparatus according to claim 7, wherein in order to confirm that the another set of decoding program codes is received by the decoder section without transfer error, a presentation time stamp (PTS) from said one audio data sequence is obtained and it is determined when decoding time is reached by using an internal system time code (STC); and wherein, when the decoding time is reached, it is confirmed whether the another set of decoding program codes is received by the decoder section without transfer error before said one audio data sequence is supplied to the decoder section.

10. The recording/reproducing apparatus according to claim 7, wherein, in order to detect the change in encoding of said one audio data sequence, a stream ID from a header portion of a packetized elementary stream (PES) packet of said one audio data sequence is obtained.

11. A method for receiving a broadcast signal having a group of packets, each being formed by packetizing audio data sequences which are encoded and by multiplexing a plurality of those sequences, and for selectively decoding one audio data sequence, the method comprising the steps of::

receiving the broadcast signal;

extracting said one audio data sequence which is designated by a user from said group of packets depending upon a property or attribute information which each packet has, and extracting a method of encoding which is applied for encoding said one audio data sequence said audio data sequence; and decoding said one audio data sequences in accordance with a set of decoding program codes if no change in encoding of said one audio data sequence is detected, wherein, when a change in encoding of said one audio data sequence is detected, said one audio data sequence is decoded in accordance with another set of decoding program codes after it is confirmed that the another set of decoding proqram codes is received without transfer error.

12. The method according to claim 11, wherein said broadcast signal corresponds to a particular program having a program number which has a corresponding program map table (PMT), and wherein, when a change in the PMT is detected, the audio data sequence is decoded in accordance with another set of decoding program codes.

13. The method according to claim 11, wherein said broadcast signal further comprises video data sequences which are packetized, encoded, and wherein said decoding section further comprises a video decoder for decoding said video data sequences and the method further comprising the step of providing an A/V decoder coupled to both the audio decoder and the video decoder so as to enable common access by each decoder.

14. The method according to claim 11, further comprising the steps of:

providing a memory in which a plurality of decoding program codes are accumulated corresponding to plural methods of encoding; and providing a digital signal processor for decoding the audio data sequences in accordance with said decoding program codes.

15. The method according to claim 11, further comprising the steps of:

in order to confirm that the another set of decoding program codes is received without transfer error, obtaining a presentation time stamp (PTS) from said one audio data sequence and determining when decoding time is reached by using an internal system time code (STC); and when the decoding time is reached, confirming whether the another set of decoding program codes is received without transfer error before decoding said one audio data sequence.

16. The method according to claim 11, wherein, in order to detect the change in encoding of said one audio data sequence, a stream ID from a header portion of a packetized elementary stream (PES) packet of said one audio data sequence is obtained.

17. A method of receiving a broadcast signal having a group of packets, each being formed by packetizing audio data sequences which are encoded and by multiplexing a plurality of those sequences, and for selectively decoding one audio data sequence, comprising the steps of:

recording the broadcast signal;

reproducing the recorded signal;

decoding said one audio data sequence in the reproduced signal in accordance with a set of decoding program codes if no change in encoding of said one audio data sequence is detected;

wherein, when a change in encoding of said one audio data sequence is detected, decoding said one audio data sequence in accordance with another set of decoding program codes after it is confirmed that the another set of decoding program codes is received without transfer error.

18. The method according to claim 17, further comprising the steps of:

providing a memory in which a plurality of decoding program codes are accumulated corresponding to plural methods of encoding; and providing a digital signal processor for decoding the audio data sequences in accordance with said decoding program codes.

19. The method according to claim 17, further comprising the steps of:

in order to confirm that the another set of decoding program codes is received without transfer error, obtaining a presentation time stamp (PTS) from said one audio data sequence and determining when decoding time is reached by using an internal system time code (STC); and when the decoding time is reached, confirming whether the another set of decoding program codes is received without transfer error before decoding said one audio data sequence.

20. The method according to claim 17, wherein, in order to detect the change in encoding of said one audio data sequence, a stream ID from a header portion of a packetized elementary stream (PES) packet of said one audio data sequence is obtained.

21. A data decoder, for inputting a group of packets, each being formed by packetizing data sequences which are encoded and by multiplexing a plurality of those sequences, and for selectively decoding one data sequence, comprising:

a memory, in which a plurality of decoding program codes are accumulated, the decoding program codes corresponding to a corresponding one of plural methods of encoding; and a digital signal processor for decoding the data sequences in accordance with said decoding program codes, sequentially, wherein when a change in said method of encoding is detected, a particular decoding program code corresponding to the changed method of encoding is transferred from said memory and is loaded into the digital signal processor, and wherein said digital signal processor begins decoding processing by using the particular decoding program code which is loaded from said memory after it is confirmed that the particular decoding program code is received by the digital signal processor without transfer error.

22. The decoder according to claim 21, wherein the data is audio data.

23. The decoder according to claim 21, wherein said memory is a read-only memory.

24. The data decoder according to claim 21, wherein in order to confirm that the another set of decoding program codes is received by the digital signal processor without transfer error, the demultiplexer obtains a presentation time stamp (PTS) from said one audio data sequence and determines when decoding time is reached by using an internal system time code (STC); and wherein, when the decoding time is reached, the demultiplexer confirms whether the another set of decoding program codes is received by the digital signal processor without transfer error before supplying said one audio data sequence to the digital signal processor.

25. The method according to claim 21, wherein, in order to detect the change in encoding of said one audio data sequence, a stream ID from a header portion of a packetized elementary stream (PES) packet of said one audio data sequence is obtained.

* * * * *

UNITED STATES PATENT AND TRADEMARK OFFICE
CERTIFICATE OF CORRECTION

| | |
|---|---|
| PATENT NO. | : 7,447,241 B2 |
| APPLICATION NO. | : 10/945905 |
| DATED | : November 4, 2008 |
| INVENTOR(S) | : Y. Fujii et al. |

It is certified that error appears in the above-identified patent and that said Letters Patent is hereby corrected as shown below:

ON PAGE 1 TITLE PAGE,

Please add Foreign Application Priority Data to read as follows:

Item (30)    Foreign Application Priority Data

Nov. 4, 1998 (JP)    10-313254

Signed and Sealed this

Twenty-fourth Day of February, 2009

JOHN DOLL
*Acting Director of the United States Patent and Trademark Office*